3,595,740
HYDROLYZED ETHYLENE/VINYL ACETATE
COPOLYMER AS OXYGEN BARRIER LAYER
Clare W. Gerow, Buffalo, N.Y., assignor to E. I. du Pont
de Nemours and Company, Wilmington, Del.
No Drawing. Filed May 8, 1968, Ser. No. 727,718
Int. Cl. B32b 27/08, 27/30
U.S. Cl. 161—254          3 Claims

ABSTRACT OF THE DISCLOSURE

Oxygen barrier films comprising an inner barrier layer of a melt extrudable hydrolyzed ethylene/vinyl acetate copolymer and outer layers comprising a base of a thermoplastic polymer and a heat sealing layer of an ethylene polymer or copolymer.

BACKGROUND OF THE INVENTION

This invention relates to laminar film structures capable of being thermally formable and heat sealable and having excellent characteristics with respect to oxygen impermeability.

One of the first film structures developed for packaging uses wherein high impermeability to passage of oxygen is a requirement, such as in gas and vacuum packaging of perishable foods, comprised a regenerated cellulose film coated with a vinylidene chloride copolymer and subsequently laminated with or coated with a layer of an ethylene polymer to permit making a hermetically sealed package. For many applications, particularly where durability requirements were not too stringent and where it was not necessary to draw down the film to form a cavity for the packaged article, such film structures have proven quite satisfactory. However, for uses in which a cavity is formed by drawing down the film, for example under vacuum, such a film structure is not satisfactory due to its lack of extensibility. For such purposes, film structures have been developed based on a biaxially oriented polyethylene terephthalate base film coated with a vinylidene chloride copolymer and thereafter either laminated or coated with a polymer of ethylene as a sealing layer. For uses wherein a still deeper drawn cavity is required, structures similar to that described above, but with a polyamide base layer, have been developed. Such barrier film structures do perform well in gas and vacuum packaging applications; but broad exploitation of these methods of packaging has not been realized, largely because these film structures are relatively expensive and because the complete barrier film structure, that is, the base layer/barrier layer/sealing layer structure, has not been broadly available to the packaging industry. In general, the vinylidene chloride copolymer coated polyester film or the corresponding polyamide film have been provided; and has been necessary to apply the sealing layer to the structure through a converter or other supplier. There have been attempts to provide a vinylidene chloride copolymer coated polyethylene structure which can subsequently be melt laminated or melt coated with the corresponding polyamide base layer to give ultimately a similar product, but this approach has not as yet come to commercial feasibility.

SUMMARY OF THE INVENTION

This invention is a laminar structure comprising a thermally formable base layer, a barrier layer of a hydrolyzed copolymer of from 15 to 65 mole percent ethylene and 85 to 35 mole percent of a vinyl ester of a lower aliphatic monobasic acid, and a heat sealable layer of a polymer or copolymer of ethylene and a vinyl ester. The barrier layer is hydrolyzed to at least 85% and has a melt index in the range of from .5 to 75. It is by this discovery of a melt extrudable barrier composition that also has excellent oxygen impermeability, that an effective and easily producible packaging film has been made feasible. The laminar structure is capable of undergoing deep draw thermoforming and has an oxygen permeability of less than about 3 cc./100 sq. in./24 hrs./atm./23° C.

DESCRIPTION OF THE INVENTION

This invention primarily concerns the discovery of a barrier composition that effectively combines the properties of high oxygen impermeability and melt extrudability by employing a hydrolyzed copolymer as a barrier layer. This barrier layer is then combined with a base layer and a heat sealable layer, and this combination constitutes a packaging film that fills the gap that has existed in the prior art. The plastic films that have been available previously are known to be relatively ineffective as oxygen barriers. The use of applicant's composition as a barrier provides effective oxygen impermeability in a film that is melt extrudable. It is important that the barrier layer not lessen the formability of the laminar film, because without the barrier layer, the oxygen permeability of the film would be at least 1000 fold greater.

In the preferred embodiment, the base layer is thermally formable and is based on a copolymer of propylene and ethylene such as a polyallomer. The barrier layer comprises an ethylene/vinyl acetate copolymer which is substantially hydrolyzed to at least 95%, has a mole percent of ethylene between 40 and 45%, and has a melt index in the range of 1 to 25. The sealing layer is an ethylene homopolymer or copolymer with a vinyl ester such as vinyl acetate.

Other particularly suitable compositions for the base layer include an ionomeric copolymer such as an ethylene/methacrylic acid copolymer partially neutralized with sodium hydroxide, or a polyamide such as polycaprolactam or polyhexamethylene adipamide or a copolymer such as hexamethylene adipamide with hexamethylene sebacamide or with caprolactam. In general, the base layer may be comprised of ethylene/propylene copolymers, ionomeric resins, polyamides and copolyamides, branched and linear polyethylene, as cast and oriented polypropylene, polycarbonates, polyvinyl chloride, polyvinyl fluoride, polyesters such as polyalkylene terephthalates and isophthalates, hexafluoropropene-tetrafluoro-ethylene copolymers, polysulfones and phenylene oxide polymers, as well as copolymers and blends of the above-mentioned polymers.

When the film structure is to be deeply drawn, such base layers as those of propylene/ethylene copolymers or polyamides are preferred in combination with the barrier layer because of their ability to undergo the thermoforming operation effectively.

Alternative resins may also be chosen for use as heat sealing layers, including polymers of ethylene, particularly those of branched polyethylenes ranging in density from about 0.91 to 0.94 as well as copolymers of ethylene with vinyl esters of organic acids such as vinyl acetate, vinyl propionate, and vinyl isobutyrate. Copolymers of ethylene with the lower acrylate esters such as methyl methacrylate, methyl acrylate, ethyl acrylate, 2-ethyl hexyl acrylate and with methacrylic acid (ionomeric resins) can also be used.

As indicated, the barrier layer comprises a hydrolyzed ethylene/vinyl acetate copolymer. The percentage composition of ethylene in the copolymer may range from 15 to 65 mole percent; the degree of hydrolysis may range from 85 to 99.5%; and the melt index of the copolymer after hydrolysis may range from 0.5 to 75. Copolymers of lower than 15 mole percent of ethylene tend to be difficult to extrude while those above 65 mole percent are deficient in barrier performance.

The barrier layer must, of course, be hydrolyzed to at least some extent to achieve its barrier properties. The degree of hydrolysis affects the degree of oxygen impermeability directly. The hydrolyzed ethylene/vinyl acetate copolymer that is used as the barrier composition allows the establishment of an acceptable balance between melt extrudability and oxygen impermeability. In general, as the degree of hydrolysis is increased, the copolymer becomes a more effective oxygen barrier. Similarly, barrier properties are enhanced as the proportion of hydrolyzed vinyl acetate moiety to ethylene in the copolymer is increased but in both cases the capability of being melt extruded decreases. Conversely, as the proportion of ethylene in the copolymer increases, the adaptability for melt extrusion becomes more favorable but oxygen barrier characteristics are degraded. Thus, it resolves into a matter of achieving an acceptable balance between melt extrudability and barrier performance.

The term thermoforming or thermally formable means that the sheet may be heat softened, then drawn, stretched and shaped by means of vacuum, application of pressure by compressed air or by various mechanical assists to shape the sheet to the contours of a die or to the product itself in the case of skin packs.

The laminar film structures of this invention can be produced in various ways. Individual layers can be formed from the appropriate resins and combined in a typical laminating operation. Alternatively, depending upon the particular fabricating pattern employed, one or more of the layers can be preformed and the remaining layer applied by melt coating or extrusion lamination, as described in Canadian Pat. No. 545,282 (melt coating) and British Pat. No. 726,949 (melt extrusion), for example. Still another method involves extruding the individual layers through separate dies and joining, in an appropriate manner, the extruded layers while still thermoplastic, as shown in U.S. Pat. No. 2,753,569.

A particularly convenient method of production, and the one preferred, involves the simultaneous extrusion of the several resins as a laminar extrudate through a single die slot which may be either in a flat die or an annular die arrangement. Suitable dies for this purpose are well known in the art. See for example, British Pat. No. 1,062,781. The final product may be additionally varied by altering the temperatures of the extruded resins.

Generally, the degree of natural adhesion between the laminar sections of the structure, resulting from extrusion, is sufficient to prevent delamination of the structure in use. But in some instances where very rigorous use conditions might be involved, adhesives may be used, in particular, hot melt adhesives, as described in Modern Packaging Encyclopedia, September 1967, p. 215. Typical hot melt adhesives include copolymers of ethylene with vinyl acetate or with alkyl acrylates such as ethyl acrylate or methyl methacrylate.

The end use is determinative of the maximum thickness for the laminar films; but there are practical minimum thicknesses of about 0.5 mil for the exterior, sealable layers, 0.2 mil for the barrier layers, and 0.1 mil for the base layer.

The main advantage of this invention is that it affords an effective barrier structure that can be produced by the convenient and efficient process of melt extrusion. The film may be used in packaging of meats and other perishable products, upon which oxygen has a detrimental or degradative effect. The laminar film is also suitable for gas and vacuum packaging and is adaptable in thermoforming techniques for blister packaging and the like.

The following examples will illustrate the principle and practice of the present invention but are not in any way limitations of this invention.

EXAMPLE 1

A laminar structure was produced by coextrusion of resins a, c, e and adhesives b and d, described below, through a five supply channel, single exit slot die at a temperature of 230° C.

Resins (a) Propylene-ethylene (95/5) copolymer—(Rexene 43S5—Rexall Chemical Co.)
(b) Ethylene/ethylacrylate copolymer—("Zetafax" 1070 Dow Chemical Co.)
(c) Hydrolyzed ethylene-vinyl acetate copolymer—(44 mole percent ethylene; 56 mole percent vinyl-alcohol; melt index—20 (ASTM–D1238); percent hydrolyzed—98.5)
(d) Ethylene/ethyl acrylate copolymer ("Zetafax" 1070 Dow Chemical Co.)
(e) Polyethylene—(Alathon 1560—Du Pont Co.)

The laminar film was then cooled. The thickness in mils of the successive layers was: 1.5/0.15/0.3/0.15/1.5. The laminar film had an oxygen permeability value of 0.3 cc./100 sq. in./24 hrs./atm./23° C. (ASTM–D1434–63).

The laminar film was subjected to a draw depth of 2½ inches on a Sureflow 7–17 F vacuum packaging machine (by Standard Packaging Corporation) operating at a temperature of about 600° F. The film showed no evidence of rupture in that deep draw. A hermetic seal was achieved by heat sealing the polyethylene surface of the thermoformed tray with the polyethylene surface of the laminar film.

EXAMPLE 2

The procedure of Example 1 was repeated with the same resins except that the hydrolyzed ethylene/vinyl acetate copolymer was comprised of 43 mol percent of ethylene and 57 mole percent of vinyl acetate with the extent of hydrolysis being about 98 and a melt index of 15. The resultant laminar film showed an oxygen permeability of 0.5 cc./100 sq. in. Performance of the laminar film on the vacuum packaging machine in deep draw thermoforming operation was essentially the same as experienced in Example 1.

EXAMPLE 3

Based on the work done, the following sample composite films would work similarly to those of the foregoing examples:

Composite structure (1) Biaxially oriented polypropylene/HEVA[1]/branched polyethylene.
(2) Nylon/HEVA/branched polyethylene
(3) Branched polyethylene/HEVA/branched polyethylene
(4) Linear polyethylene/HEVA/branched polyethylene
(5) Biaxially oriented polyethylene terephthalate/HEVA/branched polyethylene
(6) Polyallomer/HEVA/branched polyethylene
(7) A cast polypropylene/HEVA/ethylene-vinyl acetate copolymer

[1] Hydrolyzed ethylene-vinyl acetate copolymer.

What is claimed is:
1. A laminar structure comprising a thermally formable base layer, a barrier layer consisting essentially of a copolymer of 15 to 65 mole percent ethylene and 85 to 35 mole percent of a vinyl ester of a lower aliphatic monobasic acid, the copolymer being hydrolyzed to the extent of at least 85% and having a melt index of from .5 to 75, and a heat sealable layer of an ethylene polymer or copolymer.

2. A laminar structure comprising a thermally formable base layer, a barrier layer consisting essentially of a copoymer of 40 to 45 mole percent ethylene and 60 to 55 mole percent of a vinyl ester of a lower aliphatic monobasic acid, the copolymer being hydrolyzed to at least 95% and having a melt index of from 1 to 25, and a sealing layer of an ethylene homopolymer or copolymer with a vinyl ester.

3. The laminar structure in claim 2 wherein there is an oxygen permeability of less than 3 cc./100 sq. in/24 hrs./atm./23° C.

References Cited

UNITED STATES PATENTS

| | | | |
|---|---|---|---|
| 2,386,347 | 10/1945 | Roland | 260—87.3 |
| 2,543,229 | 2/1951 | Chapman | 161—254X |
| 2,909,443 | 10/1959 | Wolinski | 161—252X |

JOHN T. GOOLKASIAN, Primary Examiner

C. B. COSBY, Assistant Examiner

U.S. Cl. X.R.

156—244; 161—227, 256; 260—87.3